April 28, 1959 R. J. WEIDNER 2,884,215
MOUNTING DEVICE
Filed Oct. 30, 1953 2 Sheets-Sheet 1
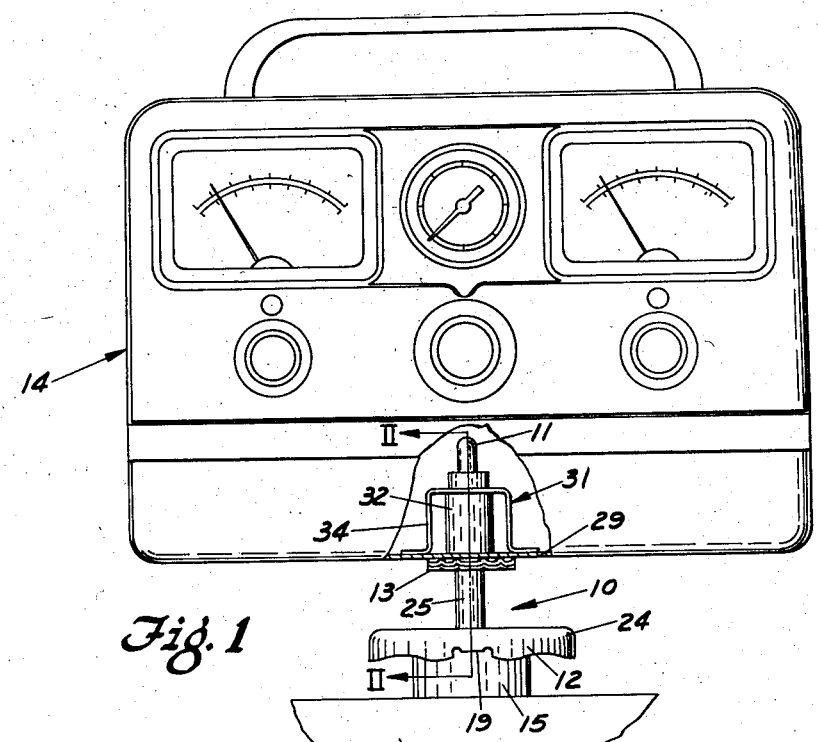
Fig. 1
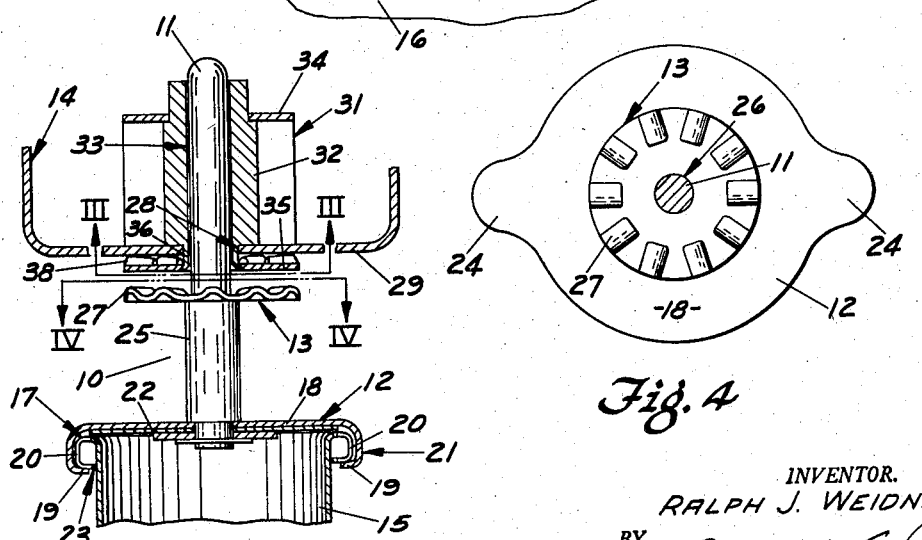
Fig. 2
Fig. 4
INVENTOR.
RALPH J. WEIDNER
BY
ATTORNEY April 28, 1959 R. J. WEIDNER 2,884,215
MOUNTING DEVICE Filed Oct. 30, 1953 2 Sheets-Sheet 2

INVENTOR.
RALPH J. WEIDNER
BY
ATTORNEY

United States Patent Office 2,884,215
Patented Apr. 28, 1959

2,884,215

MOUNTING DEVICE

Ralph J. Weidner, Kalamazoo Township, Kalamazoo County, Mich., assignor to Allen Electric Equipment Company, Kalamazoo, Mich., a corporation of Michigan Application October 30, 1953, Serial No. 389,314

2 Claims. (Cl. 248—205)

This invention relates in general to a device for mounting articles upon the upper end of a vertical pipe and particularly to a type of device for mounting an engine testing unit upon the filler pipe of an automobile engine radiator.

The use of portable, hand-carried testing units for automobile engines is subject to material inconvenience by the lack of suitable means for positioning said unit near to the engine being tested. Such units usually contain delicate instruments which are easily damaged by a fall and which are preferably positioned upright for accuracy. It is virtually impossible, using present practices, to locate a testing unit where it will read accurately, be safe from a fall, and be positioned so that its instruments can be read easily by the mechanic using the instrument.

Presently, such testing units are usually placed, when in use, on a front fender, on the engine itself, on a table located near the car, or even on the floor. In such locations, some or all of the following problems are often encountered:

(1) The instruments are exposed to severe injury.

(2) The instruments can not be easily read by the mechanic using them on the engine.

(3) The unit can not be operated by the mechanic without leaving the engine.

(4) Long leads are required, thereby creating a hazard to safety and tending to introduce electrical and mechanical errors in the instruments.

(5) The unit is positioned so that the instruments are not in an upright position, thereby introducing inaccuracies.

(6) The finish of the car, or engine wiring and parts, are exposed to damage by the unit and its leads.

Thus, such present methods of locating an engine testing unit while in use are not only inconvenient, but also defeat the very purpose of a portable unit which can be manually carried with ease. Insofar as I am aware, no means has been devised for overcoming these problems, as well as many other related problems.

Accordingly, a primary object of the invention is the provision of a device whereby a unit for testing automobile engines may be mounted upon the automobile so that it will be upright, secured from falling and clearly in view of the mechanic while he is using the unit.

A further object of this invention is the provision of a device, as aforesaid, whereby said unit will be close to the engine while positively preventing any damage to the engine or to the finish of the automobile by said unit while it is in use.

A further object of this invention is the provision of a device, as aforesaid, whereby leads of minimum length can be satisfactorily used with said unit, thereby overcoming the numerous well known hazards and inaccuracies introduced by long leads.

A further object of this invention is the provision of a device, as aforesaid, which is detachably and easily mountable upon the filler pipe of an engine radiator and is adjustably and removably attachable to the unit which it supports.

Many other objects and purposes of this invention will become apparent upon reading the following specification and examining the attached drawings in which:

Figure 1 is a side elevation view of my device mounted upon a radiator filler pipe and supporting a testing unit.

Figure 2 is a sectional view substantially as taken along the line II—II of Figure 1.

Figure 4 is a sectional view taken along the line IV—IV of Figure 2.

Figure 5:
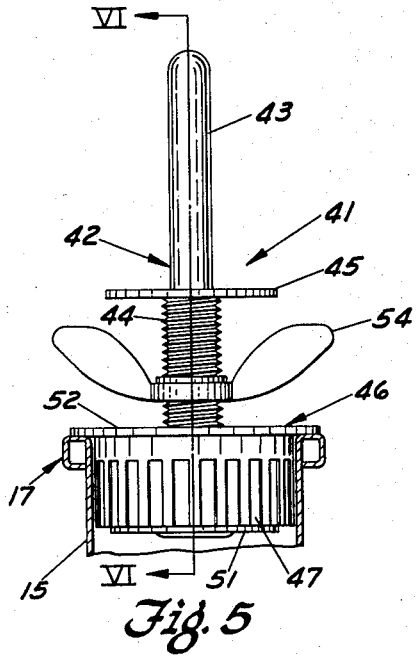
Figure 5 is a side elevation view of a modification of my invention.

In meeting the objects and purposes set forth above, I have provided a mounting device 10 (Figure 2) comprised of a rod 11 attached at one end thereof to a mounting adapter 12, said rod having a support member or plate 13 secured thereto intermediate its ends. The free end of the rod engages an article, here the testing unit 14, and the mounting adapter 12 engages the upper end of a pipe, such as the filler pipe 15 on an engine radiator 16 (Figures 1 and 2). For the purposes of convenience in description, the terms "upper" and "lower" will refer to the device and testing unit as appearing in Figures 1 and 2. The terms "inner" and "outer" will have reference to the geometric center of the device or the testing unit.

*Detailed description*

The particular embodiment of my mounting device 10 shown in Figures 1 through 4, inclusive, is comprised of a cylindrical, elongated rod 11, the upper end of which is preferably rounded. The lower end of said rod 11 is secured to a mounting adapter 12 by any conventional, convenient means such as welding, brazing, or clamping. As shown in Figures 1, 2, and 4, the mounting adapter 12 may be substantially similar to a conventional radiator cap which is mountable in a conventional manner upon the upper end of a radiator filler pipe 15. The adapter cover 12 has a cover plate 18 with a depending flange 21. A pair of ears 19 are secured to and extend inwardly from the lower edge of the flange 21 on said adapter 12. Said ears are preferably diametrically opposed with respect to the cover plate 18 in a conventional manner.

The rolled rim 17 of the filler pipe 15 is provided with a pair of diametrically opposed slots 20 (Figure 2), also in a conventional manner, for permitting the ears 19 of the mounting adapter 12 to pass the rim 17 when said adapter 12 is placed upon the pipe 15. A sealing disk 22 may be secured, as by means of the adjacent end of the rod 11, to the inside surface of the cover plate 18 for sealingly engaging the rim 17 when the adapter 12 is mounted on the filler pipe 15.

The rim 17 is provided with sloping lower edges 23 adjacent said slots 20 in a conventional manner to effect a tight grip of the adapter 12 by said ears 19 to said rim 17 when the adapter 12 is rotated. The diammetrically opposed lugs 24 on the adapter 12 permit easy manual grasping of said adapter for effecting rotation of said adapter with respect to said rim.

A support 25, which is preferably an enlarged portion of the rod 11, is disposed immediately above the adapter 12. A circular support plate or member 13, having a central opening 26, is sleeved upon the rod 11 and secured to the upper end of the support 25, as by brazing. The support plate 13 is perpendicular to the axis of the rod 11. The support 25 is secured to the cover plate 18 as by brazing or by attaching to the rod 11. The plate 13, in this particular embodiment, is provided with a plurality of equally spaced upwardly raised dimples 27 adjacent to the periphery thereof.

The article, here the testing unit 14, with which the mounting device 10 is to be used, is provided with a rod opening 28 in the bottom wall 29 thereof through which the free end of the rod 11 is receivable. In order to insure rigidity of mounting of the testing unit 14 on the rod 11, a rod brace 31 or similar means is provided in the lower portion of the testing unit 14 and may be secured to the bottom wall 29 thereof as shown in Figures 1 and 2. The rod brace 31 is comprised of a cylindrical post 32 having a co-axial circular opening 33 therethrough for snug reception of the rod 11. One end 36 of the rod post 32 is substantially reduced in diameter for extension through the rod opening 28 in the bottom wall 29. The other or upper end of the rod post 32 is slightly reduced in diameter for reception through an appropriate, snugly fitting opening in the web of a U-shaped bracket 34 whose legs are secured, as by welding, to the bottom wall 29 for securing said post 32 firmly in place, perpendicular to said bottom wall 29.

An adjustment plate 35, which is preferably substantially identical to the support plate 13, has a central opening snugly sleeved upon the reduced portion 36 of the post 32 extending below the bottom wall of the testing unit 14. Said plate 35 may be secured to said bottom wall by peening the extended end 36 of said post 32 against said plate 35, or by welding. The dimples 27 in the support plate 13 are alignable with the recesses 37, created by the dimples 38 in the adjustment plate 35, to provide a lock against accidental rotation therebetween, when said plates are in engagement (Figure 1). However, the support plate 13 and adjustment plate 35 may be locked in a plurality of different positions due to said plurality of cooperating dimples and recesses.

Figure 6:
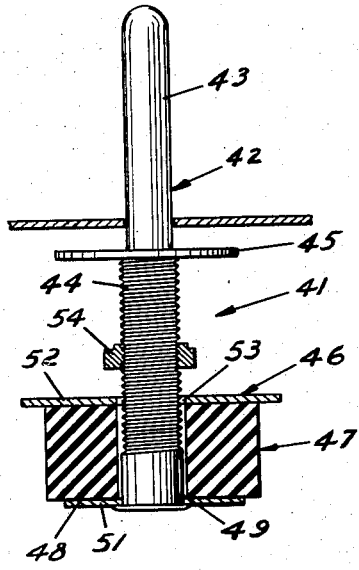
Figure 6 is a sectional view taken along the line VI—VI of Figure 5.
Figure 3:
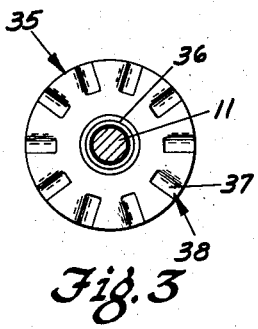
Figure 3 is a sectional view taken along the line III—III of Figure 2.

The modified form of mounting device 41, shown in Figures 5 and 6, has a rod 42 having a portion of reduced diameter 43 at its upper end and a threaded portion 44 intermediate the ends. A support plate 45, which in this embodiment is a flat circular disk, is secured to the rod 42 at the junction of the reduced portion 43 and the threaded portion 44 and is perpendicular to the axial extent of the rod 42. An adapter 46 is secured to the lower end of the rod 42. Said adapter 46 is comprised of an annular resilient element having a central opening 49 in the bottom 48 thereof. The larger end of the rod 42, which is the bottom end thereof, extends through the opening 49 where it is encircled by a flat disk 51 of larger diameter than said opening 49. Thus, the annular element 47 is prevented from movement beyond the lower end of the rod 42 by the disk 51.

The upper lip of the annular element 47 is secured to a circular cap plate 52 having a central opening 53 which encircles the threaded portion 44 of the rod 42. The cap plate 52 is substantially perpendicular to the lengthwise extent of the rod 42 and is of substantially greater diameter than the annular element 47. A wing nut 54 is threadedly engaged with the threaded portion 44 of the rod 42 between the support plate 45 and the cap plate 52.

Operation

The mounting device 10 shown in Figures 1 through 4, inclusive, is operated or employed by first securing the mounting adapter 12 to the rim 17 of the filler pipe 15. This may be accomplished by causing the ears 19 to pass through the slots 20 in the rim 17 and then twisting or rotating said adapter until the ears 19 firmly engage the lower, sloped edge 23 of the rim 17, thereby causing the sealing disk 22 to be firmly gripped against the rim 17. The mounting device 10 is now firmly secured to the rim 17, hence to the filler pipe 15.

The testing unit 14 is then raised above the rod 11 and positioned so that it is in registry with the circular rod opening 33 in the rod post 32, which extends through the bottom wall 29 of the testing unit 14 and the adjustment plate 35. The testing unit 14 is then lowered so that the upper end of the rod 11 is received into the rod opening 33. The dimples 27 of the support plate 13 will be received into corresponding recesses 37 of the adjustment plate 35. A slight rotation of the testing unit 14 with respect to the filler pipe 15 and rod 11 may be required after lowering said unit to effect this reception. If the testing unit 14 is not in the desired position, it may be manually rotated to the desired position and the engagement between the dimples 27 and the recesses 37 will hold the unit at whatever point the manual rotation is stopped. The functional engagement between the mounting device and the filler neck is ample to effectively prevent rotation of the mounting device during, and as a result of, such manual rotation of the testing unit. The rod brace 31 prevents the testing unit from tilting with respect to the rod 11.

The rod opening 28 in the bottom wall 29 of the testing unit 14 is preferably located directly below the center of gravity of said unit, thereby eliminating any bending movement being imposed upon the rod 11. Accordingly, the entire weight of the testing unit bears substantially vertically downwardly upon the upper end of the filler pipe 15. To remove the mounting device, the procedure above outlined is reversed.

The alternate or modified device 41 is mounted upon the filler pipe 15 by inserting the annular element 47 of the adapter 46 into the filler pipe 15 until the circular plate 52 bears against the rim 17 of the filler pipe 15, as shown in Figure 5. The wing nut 54 is then moved down the threaded portion 44 until it engages the circular plate 52, after which it is moved a further distance down the threaded portion, thereby causing the annular element 47 to spread radially outwardly and firmly engage the inside wall of the filler pipe 15 adjacent to the rim 17 thereof. Such action causes the adapter 46 to attach itself firmly and snugly to the filler pipe 15. After accomplishing this, the testing unit 14, or a similar article, may be placed upon the upper reduced portion 43 of the rod 42 in the same manner as hereinbefore described with respect to the mounting device 10.

In this particular embodiment, the dimpled support plate 13 of the mounting device 10 is replaced with a flat circular support plate 45. A rod brace similar to the rod brace 31 shown in Figures 1 and 2 may be used in connection with the modified device 41 for the same purposes as mentioned with respect to the device 10. It will be recognized that the particular rod brace 31, described in detail with respect to the mounting device 10, is illustrative only and can be readily replaced by a variety of rod braces capable of accomplishing the same purpose, such purpose being the maintaining of a reasonably rigid relationship between the rod and the article mounted thereupon.

Although the above specification and attached drawings relate to particular, preferred embodiments of my invention, modifications thereof which lie within the scope of such disclosure are fully contemplated within this application unless the appended claims clearly state to the contrary.

I claim:
1. In a mounting device for supporting an engine testing unit, said unit including a casing having a hole through the bottom wall thereof and having a positioning device mounted on the bottom wall thereof, said mounting device being mountable upon the filler pipe of an engine radiator, the combination comprising: a cap member releasably securable to a filler pipe of an engine radiator; an elongated rod secured to and extending upwardly from said cap member; support means mounted on said cap member and extending upwardly therefrom, said support means at least in part surrounding the lower portion of said rod and extending upwardly to a point intermediate the ends thereof; a support plate sleeved upon said rod and extending transverse thereto, said support plate being rigidly secured to said support means and said plate lying substantially parallel with said cap member and spaced a fixed distance therefrom, said support plate having a series of upstanding projections thereon cooperable with said positioning device to locate said casing in a predetermined attitude with respect to said cap member; the upper portion of said rod extending upwardly beyond the upwardmost part of said support plate a substantial distance and being the only part secured to the cap member extending upwardly beyond said support plate, said upper portion of said rod being freely slidably and snugly receivable through said hole whereby said positioning device may removably rest on said support plate so that the projections on said plate effect a positioning of said casing, which positioning may be changed by rotating said about said rod.

2. A mounting structure for supporting an engine testing unit upon the filler pipe of a radiator, comprising in combination; a casing for said unit, said casing having a bottom wall with an opening therethrough; a cylindrical member mounted on the internal surface of said bottom wall and extending upwardly within said casing, the central opening of said cylindrical member being coaxial with and constituting an extension of said opening in said bottom wall; a positioning plate secured to the outer surface of said bottom wall, said plate having an opening therethrough coaxial with the opening in said bottom wall and having a series of circumferentially spaced, downwardly extending projections thereon; a cap member releasably securable to the filler pipe of an engine radiator; an elongated rod secured to and extending upwardly from said cap member; support means mounted on said cap member and extending upwardly therefrom, said support means at least in part surrounding the lower portion of said rod and extending upwardly to a point intermediate the ends thereof, said support means having a transversely extending upper surface; a support plate sleeved on said rod and extending transverse thereto, said plate being rigidly secured to the upper surface of said support means and lying substantially parallel with said cap member and spaced a fixed distance therefrom, said support plate having a series of circumferentially spaced, upwardly extending projections thereon cooperable with the projections on said positioning plate for locating said casing in a selectable, predetermined attitude with respect to said cap member, the upper portion of said rod extending upwardly beyond the upper surface of said support plate a substantial distance and being the only part secured to said cap member which extends upwardly beyond said support plate, the upper portion of said rod freely slidably and snugly extending through the aligned openings in said positioning plate, said bottom wall and said cylindrical member whereby said positioning plate rests on said support plate, said casing being removable from said rod by lifting said casing upwardly and the attitude of said casing with respect to said cap member being changeable by rotating said casing with respect to said rod without removing said casing from said rod.

References Cited in the file of this patent

UNITED STATES PATENTS

| | | |
|---|---|---|
| 756,504 | Keil | Apr. 5, 1904 |
| 1,155,074 | Mapel | Sept. 28, 1915 |
| 1,712,796 | Jarvis | May 14, 1929 |
| 1,940,490 | Frazier | Dec. 19, 1933 |
| 1,978,577 | Harris | Oct. 30, 1934 |
| 2,363,265 | Schatzman | Nov. 21, 1944 |
| 2,367,909 | Wanner | Jan. 23, 1945 |
| 2,488,316 | Mosby | Nov. 15, 1949 |
| 2,731,228 | Baldwin et al. | Jan. 17, 1956 |